(12) United States Patent
Foster et al.

(10) Patent No.: US 6,986,389 B2
(45) Date of Patent: Jan. 17, 2006

(54) ADJUSTABLE DEPLOYMENT APPARATUS FOR AN ACTIVELY CLAMPED TUBING-CONVEYED IN-WELL SEISMIC STATION

(75) Inventors: Michael Foster, Katy, TX (US); Francis X. Bostick, III, Houston, TX (US); Robert Coon, Missouri City, TX (US); Kevin S. Kippola, Houston, TX (US); Sverre Knudsen, Trondheim (NO); Arne Berg, Kattem (NO)

(73) Assignee: Weatherford/Lamb, Inc., Houston, TX (US)

( * ) Notice: Subject to any disclaimer, the term of this patent is extended or adjusted under 35 U.S.C. 154(b) by 108 days.

(21) Appl. No.: 10/641,402

(22) Filed: Aug. 14, 2003

(65) Prior Publication Data

US 2004/0216872 A1 Nov. 4, 2004

Related U.S. Application Data

(60) Provisional application No. 60/467,511, filed on May 2, 2003.

(51) Int. Cl.
*E21B 23/00* (2006.01)
*G01V 1/00* (2006.01)

(52) U.S. Cl. .................. 166/250.16; 166/66; 367/25
(58) Field of Classification Search .......... 166/250.16, 166/66, 100, 113; 367/25
See application file for complete search history.

(56) References Cited

U.S. PATENT DOCUMENTS

| | | | | |
|---|---|---|---|---|
| 3,565,170 A | * | 2/1971 | Urbanosky | 166/212 |
| 5,181,565 A | | 1/1993 | Czernichow | 166/66 |
| 5,243,562 A | | 9/1993 | Laurent et al. | 367/25 |
| 5,355,952 A | | 10/1994 | Meynier | 166/66 |
| 5,503,225 A | | 4/1996 | Withers | 166/250.1 |
| 5,524,709 A | | 6/1996 | Withers | 166/205.1 |
| 5,860,483 A | | 1/1999 | Havig | 175/40 |
| 5,892,733 A | | 4/1999 | Havig | 367/188 |
| 5,926,437 A | | 7/1999 | Ortiz | 367/35 |
| 6,049,508 A | | 4/2000 | Deflandre | 367/48 |

(Continued)

FOREIGN PATENT DOCUMENTS

GB 2 393 749 4/2004

OTHER PUBLICATIONS

U.S. Appl. Ser. No. 10/266,903, filed Oct. 6, 2002, entitled "Multiple Component Sensor Mechanism," Berg et al.
U.S. Appl. Ser. No. 10/678,963, filed Oct. 3, 2003, entitled "Clamp Mechanism for In–Well Seismic Station," Berg et al.
U.K. Search Report, Appl. No. GB0409681.4, dated Aug. 27, 2004, dated Aug. 27, 2004.

*Primary Examiner*—William Neuder
(74) *Attorney, Agent, or Firm*—Patterson & Sheridan, L.L.P.

(57) ABSTRACT

The present invention generally relates to an apparatus and method for seismic monitoring. In one aspect, an apparatus for acoustically coupling a sensor mechanism to a surface in a wellbore is provided. The apparatus includes a mandrel disposable in a tubing string. The apparatus further includes a carrier member disposed on the mandrel, the carrier member axially adjustable relative to the mandrel. The apparatus also includes at least one sensor mounted on the carrier member, the at least one sensor connected to the surface of the well via a cable line and a deployment assembly disposed on the carrier member for coupling the at least one sensor to the surface of the well. In another aspect, a method for acoustically coupling a sensor mechanism to a surface of a wellbore is provided.

22 Claims, 12 Drawing Sheets

U.S. PATENT DOCUMENTS

| | | | |
|---|---|---|---|
| 6,230,557 B1 * | 5/2001 | Ciglenec et al. | 73/152.01 |
| 6,712,141 B1 * | 3/2004 | Bussear et al. | 166/250.17 |
| 2001/0035289 A1 * | 11/2001 | Runia | 166/66 |
| 2002/0064331 A1 | 5/2002 | Davis et al. | 385/12 |
| 2002/0180978 A1 | 12/2002 | Berg et al. | 356/477 |
| 2002/0194932 A1 | 12/2002 | Gysling et al. | 73/861.42 |
| 2003/0084707 A1 | 5/2003 | Gysling | 73/32 |
| 2004/0085857 A1 * | 5/2004 | West | 367/25 |
| 2004/0114463 A1 * | 6/2004 | Berg et al. | 367/14 |

* cited by examiner

ADJUSTABLE DEPLOYMENT APPARATUS FOR AN ACTIVELY CLAMPED TUBING-CONVEYED IN-WELL SEISMIC STATION

CROSS-REFERENCE TO RELATED APPLICATIONS

This application claims benefit of U.S. provisional patent application Ser. No. 60/467,511, filed May 2, 2003, which is herein incorporated by reference.

BACKGROUND OF THE INVENTION

1. Field of the Invention

The present invention generally relates to a downhole production operation. More particularly, the invention relates to seismic monitoring. More particularly yet, the invention relates to an adjustable deployment apparatus for an in-well seismic station.

2. Description of the Related Art

In situ measurement of the seismic wavefield generated by a surface source is becoming an increasingly common geophysical surveying procedure. This measurement, known as vertical seismic profiling (VSP), furnishes the opportunity to investigate wave propagation in the shallow earth and to estimate the seismic values describing the lithologic section. VSP can be used within a single well or can be used in multiple wells such as a cross-well arrangement. Generally, VSP includes an array utilizing of seismic stations. Each seismic station includes a plurality of sensors, such as acoustic and/or pressure sensors, which are arranged within the wellbore to measure the acoustic waves between the wellbore and the surface. The sensors provide seismic data that is analyzed by a seismic data processor to determine the subsurface stratigraphy in relation to the seismic reflections measured at the surface.

It is generally preferred to permanently position the sensors within the well without substantially interfering with normal production operation of the well. Various deployment techniques exist to mechanically couple sensors to a borehole structure, such as the production tube, the well casing, or a production packer. For instance, one deployment technique involves arranging the sensors outside the casing prior to a cementation operation. Thereafter, the sensors are surrounded by cement as the cement is injected into an annular space formed between the casing and the borehole of the well. Embedding the sensors in this manner is beneficial in that acoustic waves used in the seismic analysis can easily travel to the sensors without attenuation. In addition, different types of acoustic waves (e.g., shear waves) can be sensed using this method. However, mechanically coupling the sensors to the outside of the casing can, in some cases be difficult to perform, as in the case of complex wellhead configurations, expandable casing, multiple casing strings, tight casing annular constraints, or may limit the placement of sensors in the borehole. For example, the casing may not extend deep enough to position the sensors in the desired location.

In another deployment technique employed in vertical seismology, the sensors are only temporarily located within the well. In this deployment technique, the sensors are used to take readings and then retrieved from the well. In addition, the position of the sensors can be changed within the well to take into account alterations of the earth strata under analysis, resulting from production of effluents. However, deployment or retrieval of temporary sensors disrupts production (or injection) from the well, which can be particularly costly if measurements are periodically made to assess strata conditions over a given time period. Furthermore, preparing the sensors for insertion into the well, properly positioning the sensors, and retrieving the sensors requires tedious preparation and execution and can pose additional risk to the wellbore or wellbore completion if equipment is inadvertently lodged or dropped into the wellbore.

Recently, another deployment technique has been developed to actively couple an in-well seismic sensor to the casing of the well by using a clamp mechanism as disclosed in co-owned U.S. Provisional Patent Application having a Ser. No. 60/416,932, filed on Oct. 6, 2002, which is entitled CLAMP MECHANISM FOR IN-WELL SEISMIC SENSOR and is herein incorporated by reference. Generally, a plurality of clamp mechanisms carrying an array of sensors are deployed into the well attached to a string of production tubing. More specifically, an external clamp is employed to externally clamp the sensor to the string of tubing. Each clamp mechanism is attached to the string of production tubing at a respective joint between two production tubulars and subsequently lowered into the wellbore along with the string of production tubing. After the clamp mechanisms are positioned at their respective desired locations, a release mechanism in each clamp mechanism is activated thereby displacing the sensor radially outward until the sensor is coupled to the casing. Once coupled to the casing, the sensor is substantially acoustically decoupled from the clamp mechanism and production tubing. There are problems associated with actively coupling an in-well seismic sensor using the clamp mechanism. For example, the external clamp can be dislodged during deployment of the string of production tubing resulting in damage to the sensor system or in the tubing becoming lodged in the wellbore. In another example, a problem may arise due to length variations of the production tubulars. For instance, each production tubular has a length tolerance of several inches. This means that the spacing between each sensor in the array may vary several inches, thereby making it difficult to properly position the sensors in the wellbore. Furthermore, the rotational alignment between each clamp mechanism may be compromised due to the threaded connection between each production tube.

There is a need therefore for a seismic station deployment apparatus that is axially adjustable to compensate for length variations of the production tubing while remaining fixed to the production tubing. There is a further need therefore for a seismic station deployment apparatus that is rotationally adjustable. There is yet a further need for an effective deployment technique for placing a seismic array in a well. Further, there is a need for a cost effective means of deploying a seismic station on a casing string.

SUMMARY OF THE INVENTION

The present invention generally relates to an apparatus and method for seismic monitoring. In one aspect, an apparatus for acoustically coupling a sensor mechanism to a surface in a wellbore is provided. The apparatus includes a mandrel disposable in a tubing string. The apparatus further includes a carrier member disposed on the mandrel, the carrier member axially adjustable relative to the mandrel. The apparatus also includes at least one sensor mounted on the carrier member, the at least one sensor connected to the surface of the well via a cable line and a deployment assembly disposed on the carrier member for coupling the at least one sensor to the surface of the well.

In another aspect, a method for acoustically coupling a sensor mechanism to a surface of a wellbore is provided. The method includes placing a deployment apparatus in a string of production tubing and adjusting a carrier member to a predetermined axial location relative to a mandrel and securing the carrier member to the mandrel. The method further includes lowering the string of production tubing and the deployment apparatus into the wellbore and positioning the deployment apparatus at a predetermined location in the wellbore. The method also includes activating the deployment assembly thereby urging at least one sensor radially outward toward the surface of the wellbore and coupling the at least one sensor to the surface of the wellbore.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope for the invention may admit to other equally effective embodiments.

DETAILED DESCRIPTION OF THE PREFERRED EMBODIMENT

The present invention generally relates to an apparatus and a method for acoustically coupling a sensor mechanism to a surface in a wellbore. More specifically, the apparatus is used to axially and rotationally align optical sensors in an array. It is to be understood, however, that the apparatus may be employed with any type of sensors, such as electrical sensors, pneumatic sensors or any type of sensing mechanism known in the art.

Figure 1:
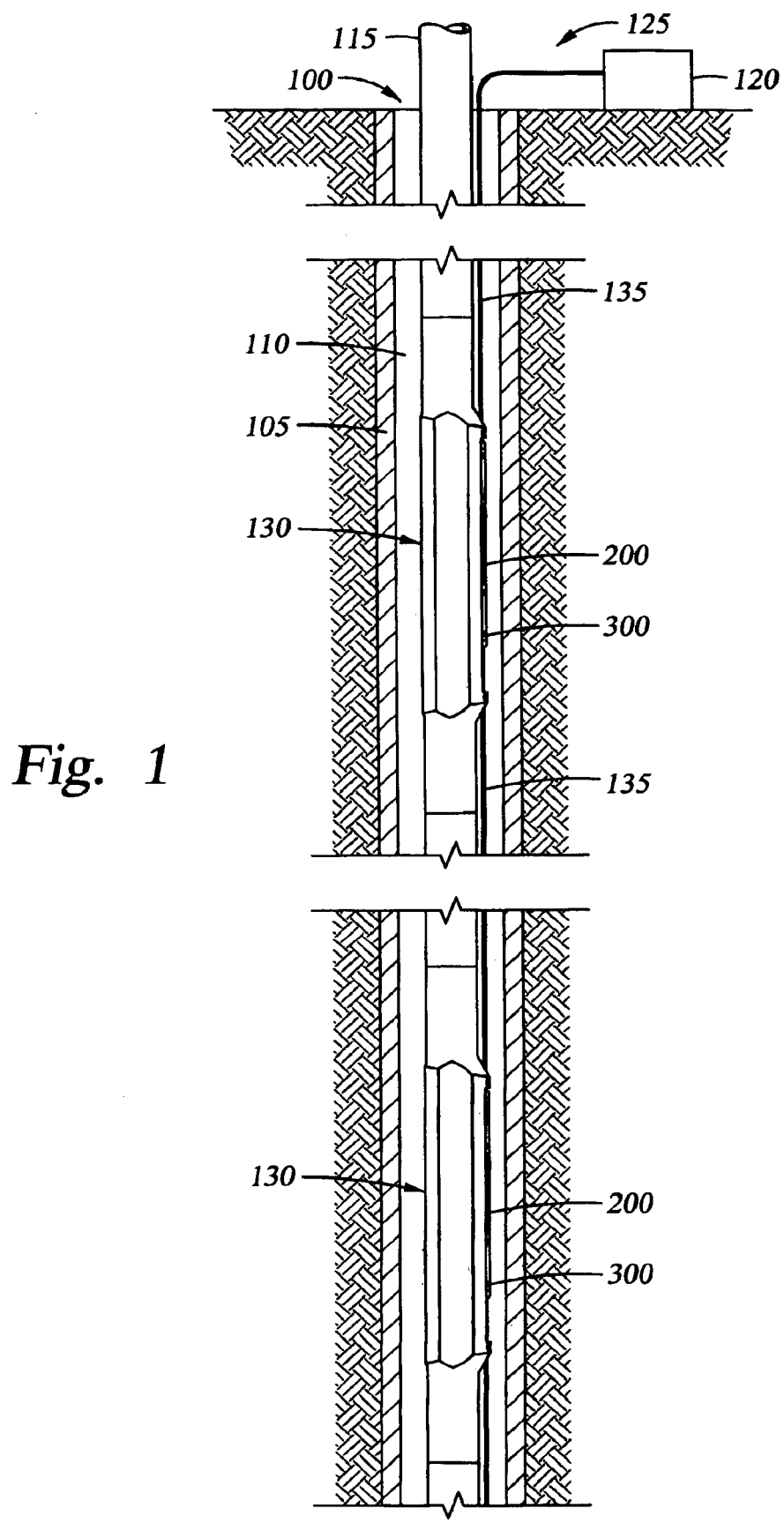
FIG. 1 is a view illustrating a seismic array disposed in a well.

FIG. 1 is a view illustrating a seismic array 125 disposed in a well 100. The array 125 includes a plurality of seismic stations 130 operatively attached to a string of production tubing 115 and interconnected by inter-station cables 135. As illustrated, the array 125 is deployed in a well 100, which has been drilled down to a subsurface production zone. The well 100 is typically lined with a string of casing 105 that is secured to the surrounding formations by a cementation operation.

Each seismic station 130 includes a sensor mechanism 200 and an adjustable deployment apparatus 300 of the present invention. The sensor mechanisms 200 are interconnected by the inter-station cables 135 to a source/sensing/data collection apparatus 120, which typically includes a demodulator and optical signal processing equipment (not shown). The inter-station cables 135 are typically ¼-inch diameter cables housing an optical waveguide, such as an optical fiber, between the sensor mechanisms 200 and the collection apparatus 120.

Each sensor mechanism 200 includes one or more sensors (not shown), among other components as described in a subsequent paragraph. The adjustable deployment apparatus 300 couple the sensor mechanism 200 to the production tubing 115, which is then lowered to a desired depth in the well 100. Once deployed in the well 100, the sensors of the sensor mechanism 200 are actively coupled to the casing 105 using the adjustable deployment apparatus 300 of the present invention.

Generally, seismology involves the detection of acoustic waves to determine the strata of geologic features, and hence the probable location of wellbore formations. A seismic generator (not shown) arranged at the surface or in another well is used to generate acoustic waves. Acoustic waves radiate from the source along direct paths and reflected paths through the various layers of earth. The seismic waves cause the surrounding earth layers to react, and the motion is detected by the sensors in the sensor mechanism 200 through the casing 105 coupled to the earth. Resulting signals are transmitted through the inter-station cable 135 to the source/sensing/data collection apparatus 120, which interrogates the sensor mechanisms 200.

Each sensor mechanism 200 may include one or more optical fiber based sensors, such as Fiber Bragg Gratings (FBGs) that reflect a narrow wavelength band of light having a central wavelength. If each sensor has a different reflection wavelength, the reflected signals may be easily detected using Wavelength Division Multiplexing (WDM) techniques. If the sensors have the same wavelength, reflected signals can be resolved in time using Time Division Multiplexing (TDM) techniques. Such multiplexing technologies and mixtures thereof are well known in the art. For brevity, well-known additional steps, devices, and techniques employed in the methods of seismic sensing are omitted.

When performing vertical seismic profiling, the seismic stations 130 of the array 125 are distributed over a known length, for example, 5000 feet. Over the known length, the seismic stations 130 can be evenly spaced at desired intervals, such as every 10 to 20 feet, for providing a desired resolution. Accordingly, the array 125 may include hundreds of sensor mechanisms 200 and associated adjustable deployment apparatus 300. Because optical waveguide connectors (not shown), such as fiber optic connectors, on the inter-station cables 135 between the sensor mechanisms 200 can generate signal loss and back reflection of the signal, the use of such connectors is preferably minimized or eliminated in the array 125. The practical consequence of limiting the use of fiber optic connectors is that all or most of the sensor mechanisms 200 must be spliced with the inter-station cables 135 before being transported to the well 100.

The adjustable deployment apparatus 300 of the present invention facilitates the pre-assembly, deployment, and retrieval of the array 125. The adjustable deployment apparatus 300 is operatively attached to the production tubing 115 and is capable of actively coupling the sensors of the sensor mechanism 200 to the inner wall of the string of casing 105.

Figure 2:
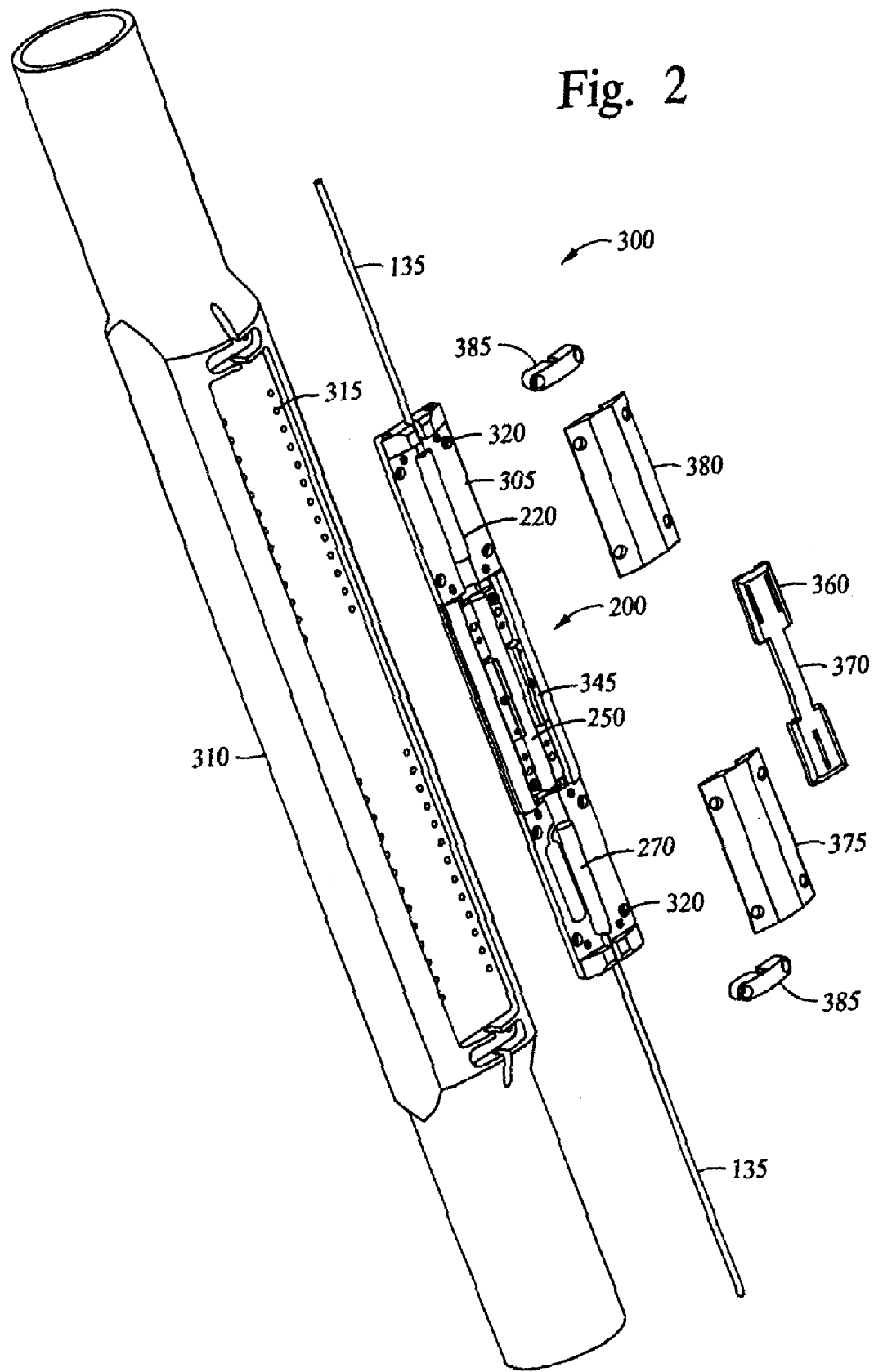
FIG. 2 is an isometric view illustrating an adjustable deployment apparatus of the present invention.

FIG. 2 is an exploded isometric view illustrating the adjustable deployment apparatus 300 of the present invention. For ease of explanation, the adjustable deployment apparatus 300 will first be described generally with respect to FIG. 2, thereafter more specifically in subsequent figures.

The adjustable deployment apparatus 300 provides a means to adjust the axial location of the sensor mechanism 200 to compensate for any length deviations in the production tubing (not shown), thereby ensuring the proper spacing between other sensor mechanisms. The deployment apparatus 300 includes a seismic mandrel 310 with a connection means at each end thereof for attachment to the string of production tubing (not shown). The seismic mandrel 310 is constructed and arranged to house a seismic carrier 305. In the embodiment shown, the seismic mandrel 310 includes a plurality of adjustment holes 315 formed on an upper portion thereof. The plurality of holes 315 align with a plurality of mounting holes 320 for attaching the carrier 305 to the mandrel 310. Additionally, the holes 315 are evenly spaced at along the upper portion of the mandrel 310 to define a predetermined length of axial movement for the carrier 305 and the sensor mechanism 200. It should be noted, however, that any suitable means known in the art may be utilized to adjust the carrier 305 relative to the mandrel 310. For instance, in an alternative embodiment, an adjustment rail (not shown) and an adjustment slide (not shown) may be employed. In this embodiment, the carrier 305 is operatively attached to the adjustment slide and then adjusted relative to the mandrel 310 to a desired position. Thereafter, the adjustment rail clamps the carrier 305 and the adjustment slide to the mandrel 310 at the desired location.

The adjustable deployment apparatus 300 provides a means to couple the sensor mechanism 200 to the surrounding casing (not shown). Generally, the seismic carrier 305 includes a deployment assembly 345 with a release mechanism to activate the deployment assembly 345 at a predetermined point. The release mechanism can be activated by telemetry, electrical signal, pressure differential, a rupture disc, or other methods. Due to daily rig costs and risks inherent in coiled-tubing and wire-line intervention of electrically activated release, the release mechanism is preferably activated without intervention. After activation, the deployment assembly 345 urges a portion of the sensor mechanism 200 radially outward toward the surrounding casing.

As clearly shown in FIG. 2, several covers have been removed to illustrate the location of the various components of the sensor mechanism 200 on the adjustable deployment apparatus 300. For instance, an upper splice tube cover 380 has been removed to illustrate the location of a first splice component 220 and a lower splice tube cover 375 has been removed to illustrate the location of a second splice component 270. The covers 380, 375 are used to protect the first splice component 220 and the second splice component 270, respectfully. Preferably, the covers 380, 375 extend past the ends of the first splice component 220 and the second splice component 270 to protect a plurality of intra-station cables (not shown). Additionally, the covers 380, 375 may reduce the risk of jamming downhole as the adjustable deployment apparatus 300 is removed from the well.

As illustrated, an accelerometer top support 370 is constructed and arranged to fit over a sensor component 250. The accelerometer top support 370 includes a plurality of contact points 360 to provide a means for the sensor component 250 to contact the surrounding casing (not shown). The contact points 360 are positioned with a wide separation to achieve maximum stability when coupled to the casing. The contact points 360 are subject to wear as they contact the casing. Consequently, for the embodiment illustrated, the contact points 360 are made of martenistic, precipitation hardened stainless steel UNS S17400 to reduce the wear during installation and operation. Additionally, a plurality of cable support covers 385 may be used to secure the inter-station cables 135 to the seismic mandrel 310.

Figure 3:
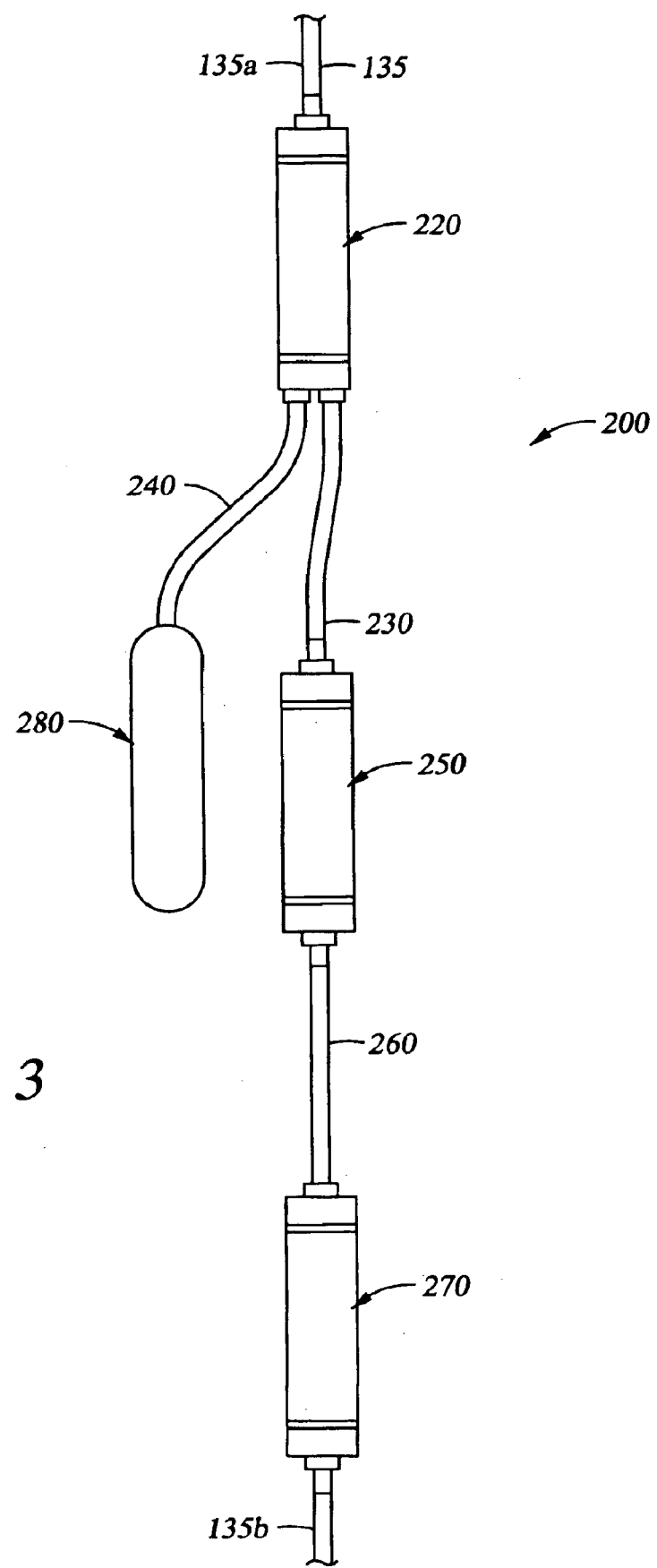
FIG. 3 is a view illustrating a sensor mechanism for use with the adjustable deployment apparatus.

FIG. 3 is a view illustrating the sensor mechanism 200 for use with the adjustable deployment apparatus 300. For clarity, the sensor mechanism 200 is illustrated removed from the adjustable deployment apparatus 300. The sensor mechanism 200 generally includes the first and the second splice components 220, 270 and the sensor component 250. A first intra-station cable 230 connects the first splice component 220 with a sensor component 250, and a second intra-station cable 260 connects the sensor component 250 with the second splice component 270. The sensor mechanism 200 may also include another sensor component 280 connected to the first splice component 220 with a third intra-station cable 240.

As depicted, first and second inter-station cables 135a, 135b are connected at both ends of the sensor mechanism 200. The dual-ended sensor mechanism 200 arrangement allows several sensor mechanisms to be multiplexed in series or allows the sensor mechanism 200 to be multiplexed with other optical waveguide measuring devices, such as pressure sensors, temperature sensors, flow rate sensors or meters, speed of sound or phase fraction sensors or meters, or other like devices, for example, using well known wavelength multiplexing techniques.

If only one sensor mechanism 200 is used or if the sensor mechanism 200 is the last in an array of sensor mechanisms, the second intra-station cable 260, the second splice component 270, and the inter-station cable 135b need not be connected to the end of the sensor component 250. Ultimately, the inter-station cable 135 connects to a source/sensing/data collection apparatus (not shown), which is well known in the art and is capable of interrogating the sensors in the mechanism 200 and interpreting data retrieved therefrom.

The first splice component 220 houses a fiber organizer, splices, and other devices (not shown) for optical fiber delivered from the inter-station cable 135a. For example, excess fiber from the cable 135a can be wound on a fiber organizer within the splice component 220. The first intra-station cable 230 carries optical fiber from the first splice component 220 to the sensor component 250. The sensor component 250 houses one or more sensors (not shown).

The second intra-station cable 260 carries optical waveguide, such as optical fiber, from the sensor component 250 to the second splice component 270. The second splice component 270 is substantially similar to the first splice component 220 and houses a fiber organizer, splices, and other devices (not shown) for optical fiber. As noted above, the second inter-station cable 135b may be connected to another sensor mechanism 200 of the array. Otherwise, the second splice component 270 can have a terminated end or can be eliminated altogether. The third intra-station cable 240 can carry optical fiber from the first splice component 220 to the second sensor component 280, which can be a fiber optic based hydrophone, for example, of which several are well known.

Many different types of sensors may be used in conjunction with the disclosed sensor mechanism 200. In a preferred embodiment for in-well seismic sensing, the sensor mechanism 200 preferably houses one or more accelerometers. The accelerometers (not shown) can be arranged to measure acceleration from acoustic waves in any of three orthogonal axes (x, y, and z) and can transmit respective sensing light signals indicative of static and dynamic forces at their location on the optical fiber. In some embodiments, the sensor mechanism 200 houses more than one geophone or accelerometer for sensing multi-component seismic data. An example of a multi-component seismic data arrangement is a three component seismic data that uses three orthogonally oriented geophones or accelerometers. In another example, a four component seismic data involves the addition of a hydrophone to three orthogonally oriented geophones or accelerometers. This technique allows determination of both the type of wave and its direction of propagation.

The components 220, 250, and 270 of the sensor mechanism 200 preferably have cylindrical housings, allowing the sensor mechanism 200 to have a small profile for use in the adjustable deployment apparatus 300 of the present invention. In FIG. 3, the sensor mechanism 200 is depicted in a basic form to show the general details of the present invention. Relevant detail of the components, materials, and methods of manufacture for the sensor mechanism 200 can be obtained from U.S. patent application Ser. No. 10/068,266, entitled "Multiple Component Sensor Mechanism," which is incorporated herein by reference in its entirety.

Although the present embodiment of the adjustable deployment apparatus 300 is used with the multiple component sensor mechanism 200 having cylindrical housings, one skilled in the art will appreciate that the adjustable deployment apparatus 300 can be used with other sensor mechanisms having other configurations. Furthermore, it is understood that the sensor mechanism 200 preferably has temperature, pressure, shock, and random vibration ratings suitable for deployment in a well.

Figure 4:
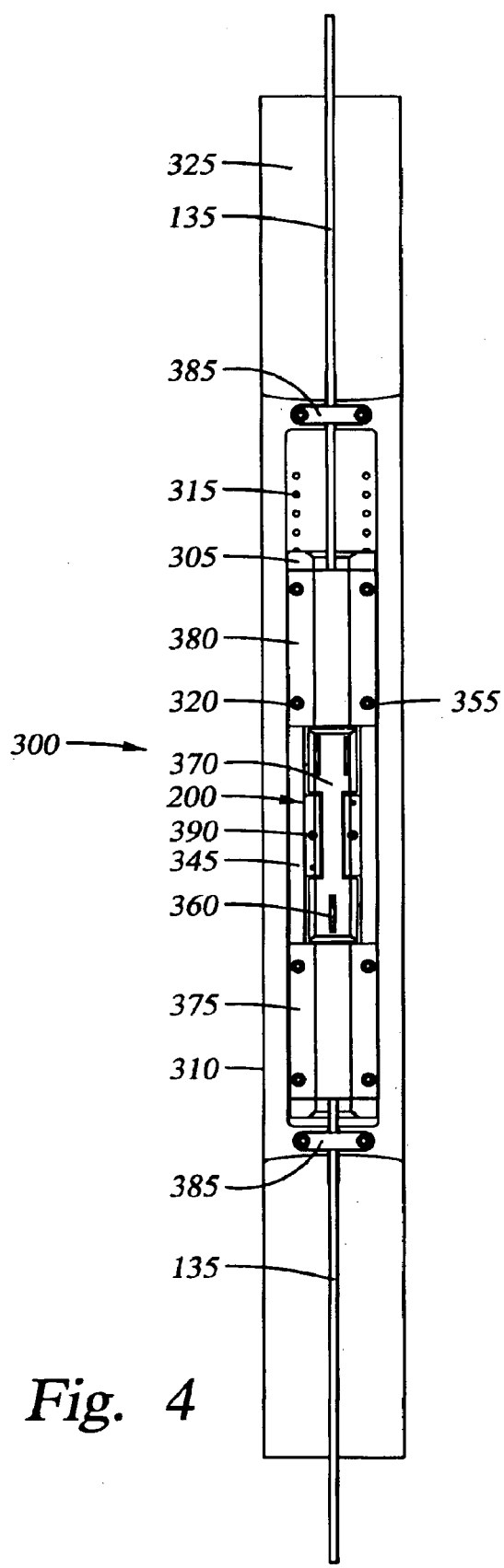
FIG. 4 is a view illustrating a seismic carrier adjusted to a lower position on a seismic mandrel.

FIG. 4 is a view illustrating the seismic carrier 305 adjusted to a lower position on the seismic mandrel 310. In this position, the distance between the sensor mechanism 200 and another sensor mechanism thereabove is maximized while the distance between the sensor mechanism 200 and another sensor mechanism therebelow is minimized. As discussed in a previous paragraph, the seismic carrier 305 axially moves the predefined distance within the seismic mandrel 310 to adjust the location of the sensor mechanism 200 relative to other sensor mechanisms (not shown). After the seismic carrier 305 is moved to a desired position, a plurality of mechanical connectors 355, such as bolts, are used to secure the seismic carrier 305 to the seismic mandrel 310. In this manner, the adjustable deployment apparatus 300 provides a means to axially locate the sensor mechanism 200 relative to other sensor mechanisms to compensate for any length deviations in the production tubing (not shown), thereby ensuring the proper spacing between sensor mechanisms.

Figure 5:
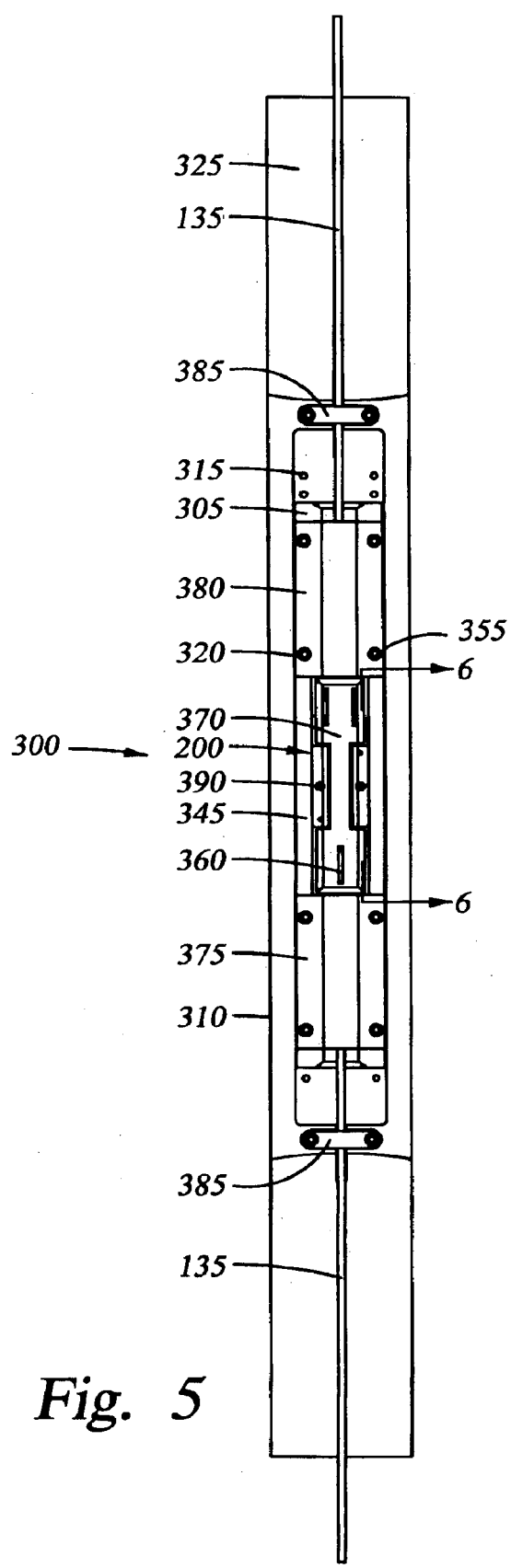
FIG. 5 is a view illustrating the seismic carrier adjusted to a middle position on the seismic mandrel.

FIG. 5 is a view illustrating the seismic carrier 305 adjusted to a middle position on the seismic mandrel 310. In a similar manner as discussed in FIG. 5, the seismic carrier 305 may be axially adjusted and secured in the middle position by the plurality of mechanical connectors 355. In this position, the distance between the sensor mechanism 200 and other sensor mechanisms (not shown) are substantially equal. The sensor mechanism 200 may also be moved to an upper position (not shown) to minimize the spacing between the sensor mechanism 200 and another sensor mechanism disposed thereabove while maximizing the spacing between the sensor mechanism and another sensor mechanism disposed therebelow. In this respect, the sensor mechanism 200 may be adjusted to any location between the lower position and the upper position as defined by the plurality of adjustment holes 315 formed in the seismic mandrel 310. For example, in the embodiment illustrated, the sensor mechanism 200 may be adjusted 6 inches axially upward or 6 inches axially downward for a total adjustment of 12 inches relative to other sensor mechanisms (not shown).

Figure 6:
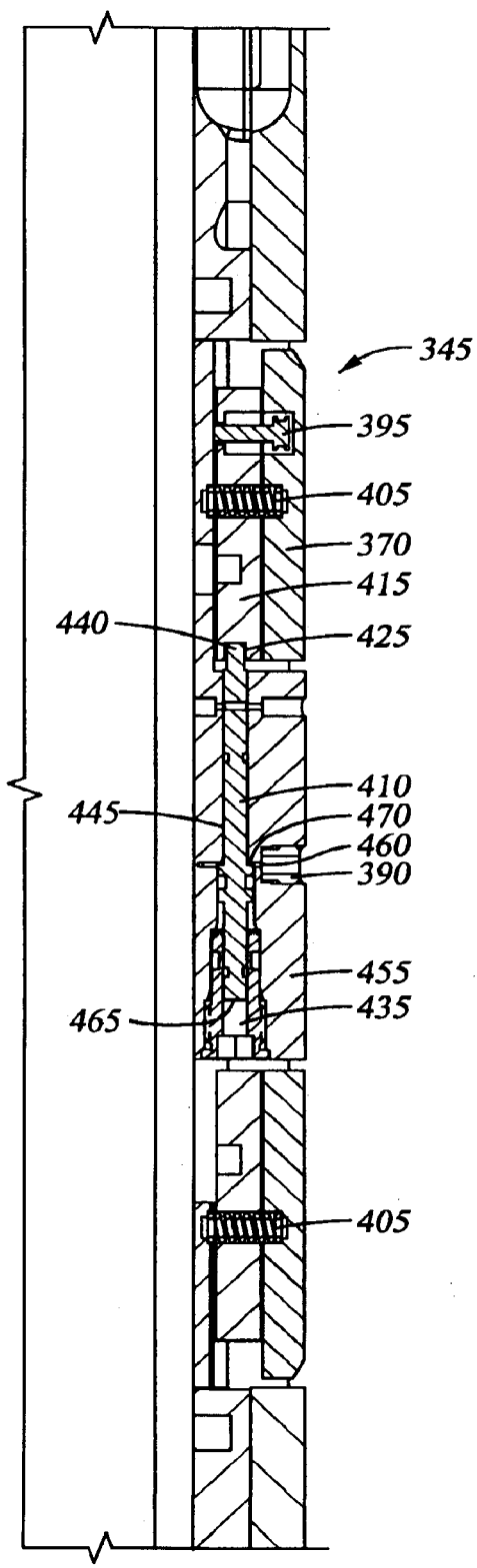
FIG. 6 is a cross-sectional view taken along line 6—6 in FIG. 5 to illustrate the location of a movable piston prior to activation of the deployment assembly.

FIG. 6 is a cross-sectional view taken along line 6—6 in FIG. 5 to illustrate the location of a movable piston 410 prior to activation of the deployment assembly 345. The deployment assembly 345 uses well pressure to remotely release the sensor mechanism (not shown). The deployment assembly 345 includes the piston 410 that is movably positioned in a bore 445 formed in a side member 455. The piston 410 includes a piston head 440 engagable with a profile 425 formed in a bottom support 415. The piston 410 further includes a piston end 465 that defines one side of a chamber 435 formed in the side member 455. Preferably, the chamber 435 is sealed and filled with air at substantially one atmosphere. The piston 410 further includes a piston shoulder 470 that defines one end of an expandable chamber 460 formed in the side member 455. As shown, the expandable chamber 460 is fluidly connected to the rupture disc 390.

Figure 7:
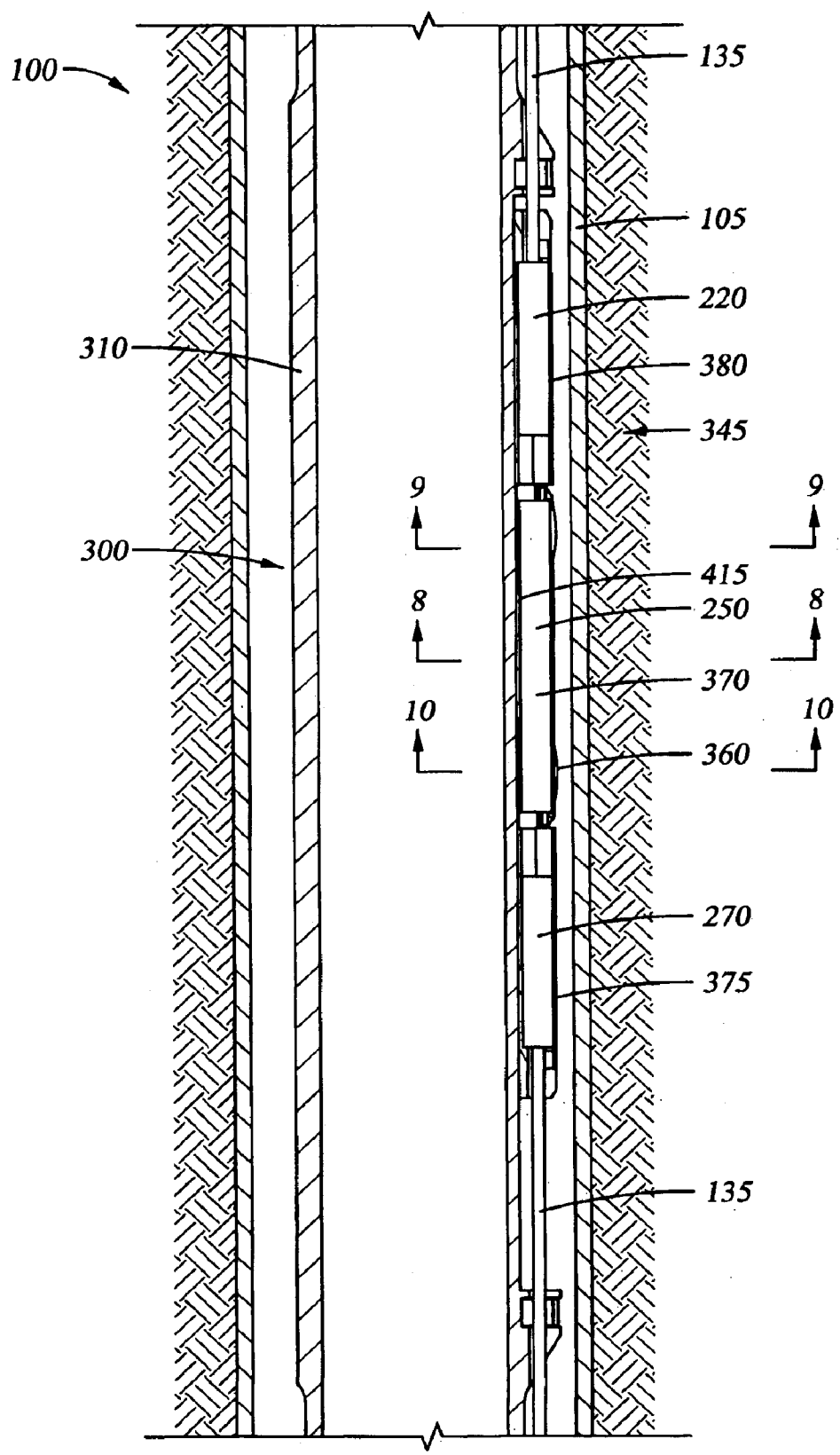
FIG. 7 is a cross-sectional view of the deployment apparatus disposed in the wellbore prior to coupling the sensor component to the surrounding casing.

FIG. 7 is a cross-sectional view of the deployment apparatus 300 disposed in the wellbore prior to attaching the sensor component 250 to the surrounding casing 105. As shown, the deployment assembly 345 is in an unreleased state holding the sensor component 250 and the supports 370, 415 adjacent the seismic mandrel 310. In the unreleased state, the apparatus 300 may be easily deployed and moved to a desired position within the well 100. As further shown, the sensor component 250 is substantially the same distance from the surrounding casing 105 as the first and second splice components 220, 270.

Figure 8:
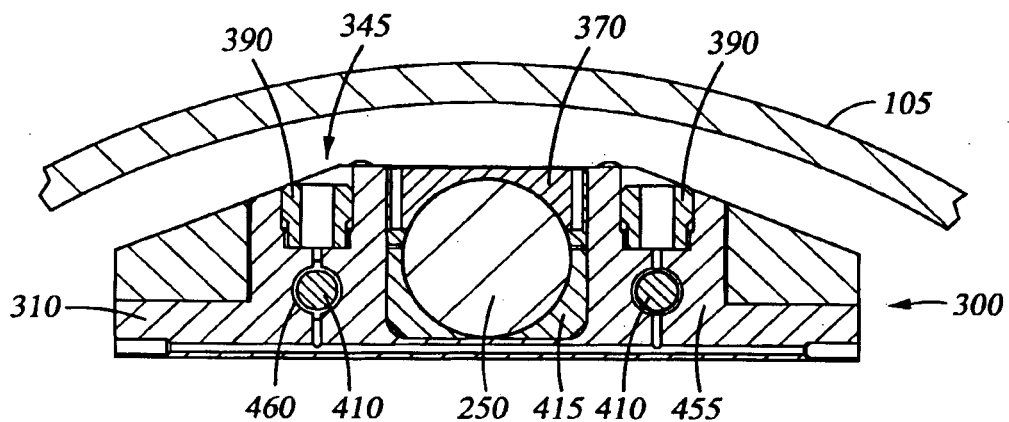
FIG. 8 is a cross-sectional view taken along line 8—8 in FIG. 7 to illustrate a rupture disc prior to the activation of a deployment assembly.

FIG. 8 is a cross-sectional view taken along line 8—8 in FIG. 7 to illustrate the rupture disc 390 prior to the activation of the deployment assembly 345. As illustrated, the rupture disc 390 is disposed in a bore formed in the side member 455. The bore is in fluid communication with the expandable chamber 460. As is known in the art, the rupture disc 390 is designed to rupture at a predetermined pressure differential. A combination of material thickness, material selection, surface area, and geometry of the disc 390 are used to regulate the predetermined pressure differential at which it will rupture. Rupture discs 390 can have a non-fragmenting design and may not require vacuum support. Rupture discs can be made of numerous materials known in the art and can range in sizes from ½" (12-mm) to 60" (1200-mm), for example. Furthermore, rupture discs are known to be resistant to corrosion, can withstand operating temperatures up to 400° F. or even 800° F., can be designed for a wide range of burst pressures, can have tight burst pressure tolerances, and can have low flow resistance.

Figure 9:
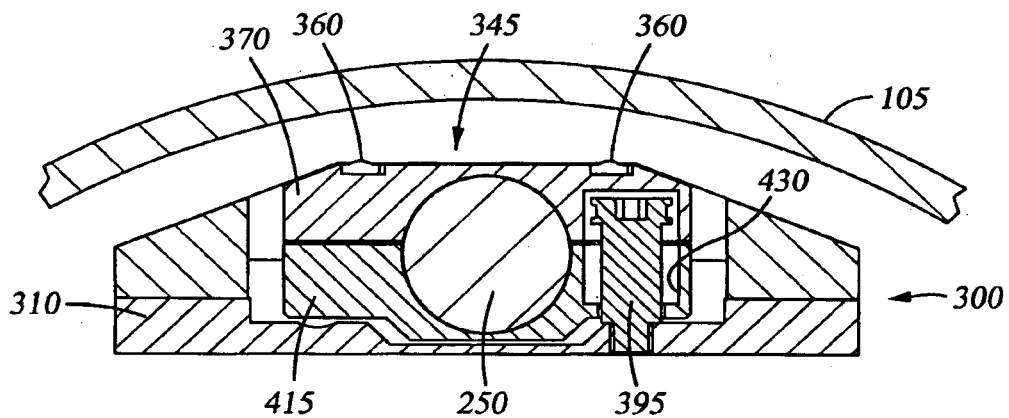
FIG. 9 is a cross-sectional view taken along line 9—9 in FIG. 7 to illustrate a guide mechanism prior to the activation of the deployment assembly 345.

FIG. 9 is a cross-sectional view taken along line 9—9 in FIG. 7 to illustrate a guide mechanism 395 in the deployment assembly 345. The deployment assembly 345 includes the guide mechanism 395, such as a guide pin for guiding the sensor component 250, bottom support 415, and the top support 370 toward the surrounding casing 105. Preferably, the guide mechanism 395 is disposed in a profile 430 formed in the supports 415, 370. The guide mechanism 395 guides the sensor component 250 and the supports 415, 370 substantially perpendicular to the axis of the seismic mandrel 310. Typically, the guide mechanism 395 includes stops, shoulders, or widened portions on their upper end to keep the supports 415, 370 from coming out from the seismic mandrel 310 during retrieval of the adjustable deployment apparatus 300. In this manner, the guide mechanism 395 ensures that the sensor component 250 moves radially outward in to contact with the surrounding casing 105.

Figure 10:
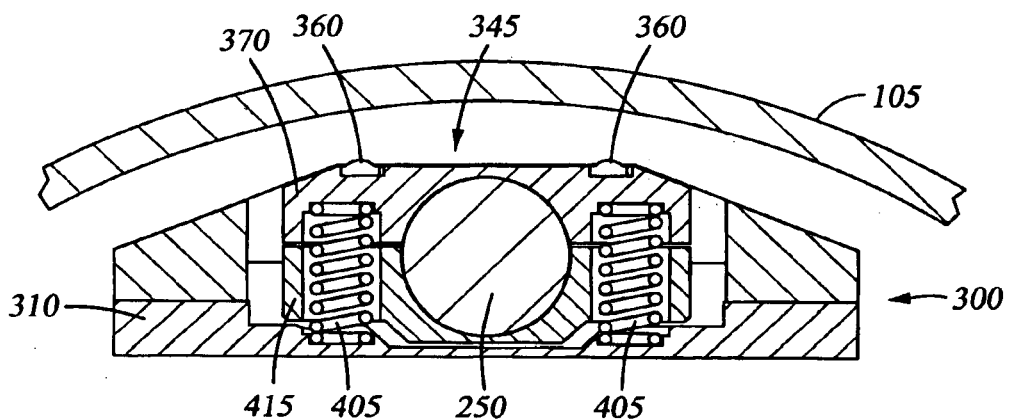
FIG. 10 is a cross-sectional view taken along line 10—10 in FIG. 7 to illustrate a plurality biasing members prior to the activation of the deployment assembly.

FIG. 10 is a cross-sectional view taken along line 10—10 in FIG. 7 to illustrate a plurality biasing members 405 in the deployment assembly 345. Generally, the plurality of biasing members 405 are used to push the supports 415, 370 simultaneously away from the seismic mandrel 310 and toward the surrounding casing 105 after the deployment assembly 345 is activated. Determining the required and optimal pushing force of the biasing members 405 requires consideration of a number of constraints, including consideration of achieving an acceptable seismic coupling in both vertical and horizontal wells and of avoiding unacceptable shock during the release of the supports 415, 370 and sensor component 250. The minimum required force from the biasing members 405 also depends on the weight of the assembled supports 415, 370 and sensor component 250, the stiffness of the intra-station cables (not shown) coupled to the sensor component 250, the viscosity of any material in the well, and the type of well in which the mechanisms are deployed (e.g., a vertical, deviated, or horizontal well) among other variables.

The positioning of the biasing members 405 with respect to the contact points 360 provides stability and reduces the risk of unwanted resonance. In this regard, it can be preferable to position the contact points 360 at a further lateral distance than the biasing members 405. The resonance of the biasing members 405 must also be taken into consideration. The pushing force of the biasing members 405 is also preferably optimized to minimize the risk of vibration of the sensor component 250 when deployed against the casing 105. The biasing members 405 are preferably capable of providing a pushing force that is approximately three to four times the weight of the sensor component 250 with the supports 370, 415 to ensure adequate coupling with the casing 105, which is believed to reduce the probability of resonance without reducing sensor sensitivity. This level of force is also sufficient to overcome the usually insignificant resistance of the thin, intra-station cables (not shown). One of ordinary skill in the art will appreciate that the stiffness and pushing force of the biasing members 405 provided above are only exemplary and can be readily altered depending on the requirements of an intended application of the present invention.

Figure 11:
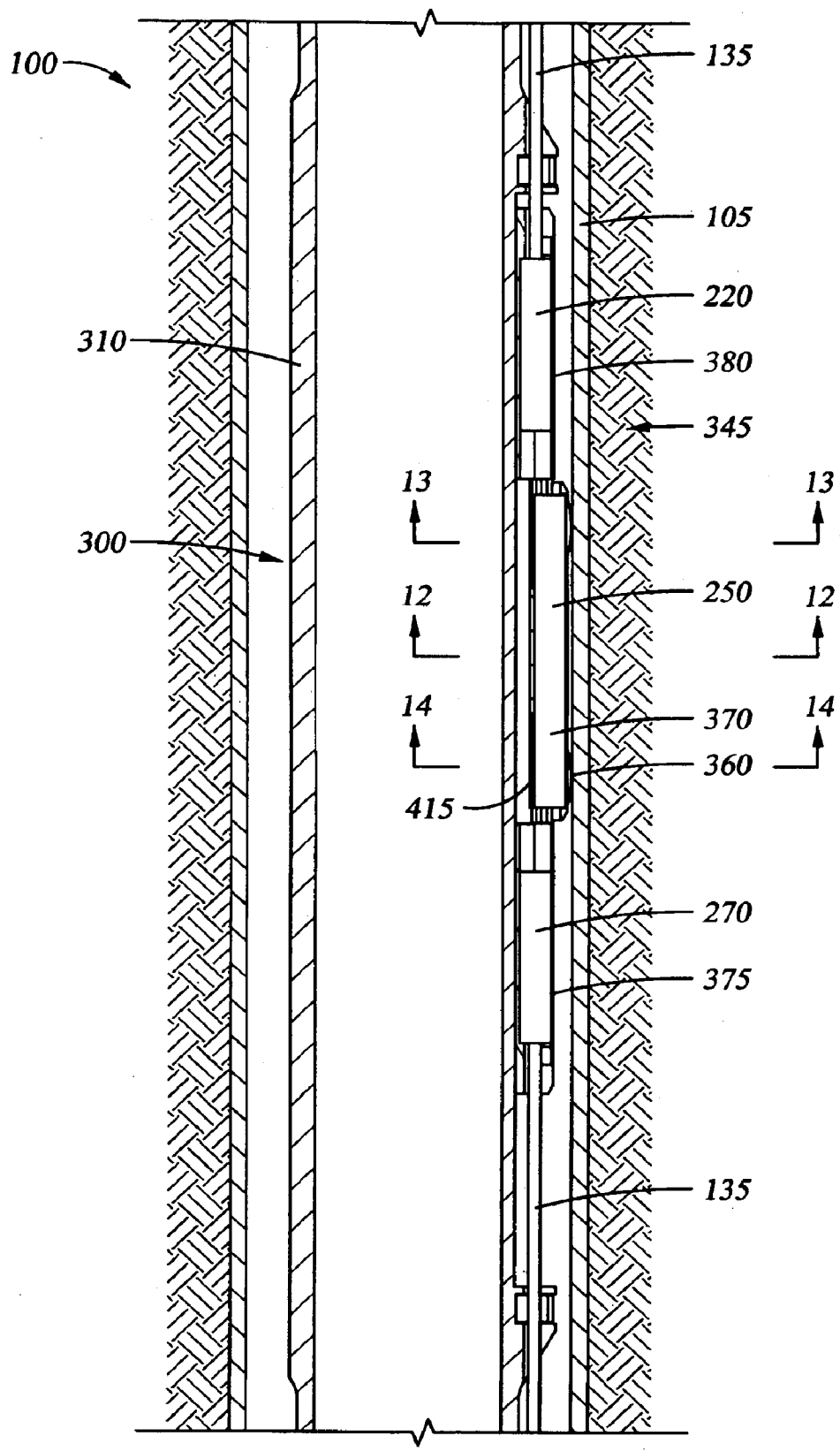
FIG. 11 is a cross-sectional view of the deployment apparatus disposed in the wellbore after the sensor component is coupled to the surrounding casing.

FIG. 11 is a cross-sectional view of the deployment apparatus 300 disposed in the wellbore after the sensor component 250 is coupled to the surrounding casing 105. As shown, the deployment assembly 345 is in a released state extending the sensor component 250 and the supports 370, 415 away from the seismic mandrel 310. As further shown, the sensor component 250 is in substantial contact with the surrounding casing 105 to detect the motion from the surrounding earth layers as they react to the seismic waves.

Figure 12:
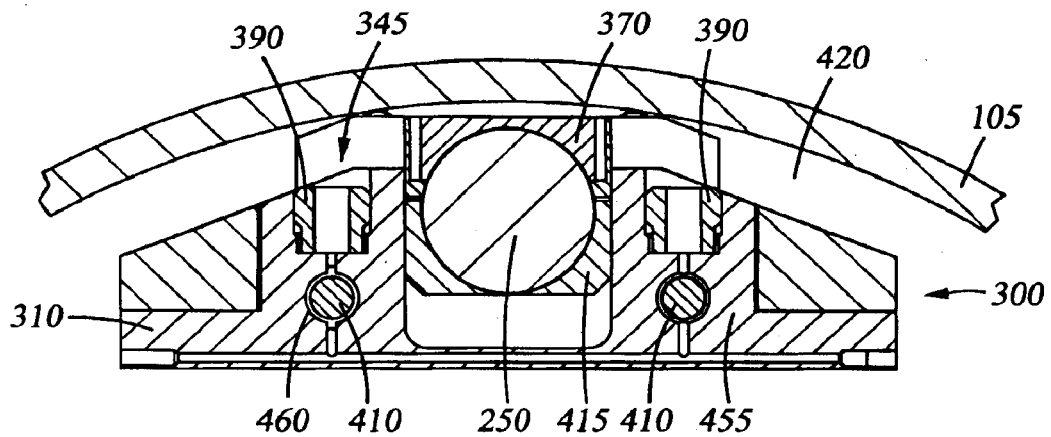
FIG. 12 is a cross-sectional view taken along line 12—12 in FIG. 11 to illustrate the rupture disc after activation of the deployment assembly.

FIG. 12 is a cross-sectional view taken along line 12—12 in FIG. 11 to illustrate the rupture disc 390 after activation of the deployment assembly 345. Preferably, an annulus 420 formed between the casing 105 and the deployment apparatus 300 is pressurized with fluid to create a pressure differential across the rupture disc 390. At a predetermined pressure, the disc 390 ruptures causing metal segments of the disc 390 to fold back and provide an opening therethrough. In other words, the rupture disc 390 fails and subsequently provides a path for fluid communication between the annulus 420 and the expandable chamber 460. As the expandable chamber 460 fills with fluid, the fluid becomes pressurized and moves the piston 410 within the bore (not shown).

Figure 13:
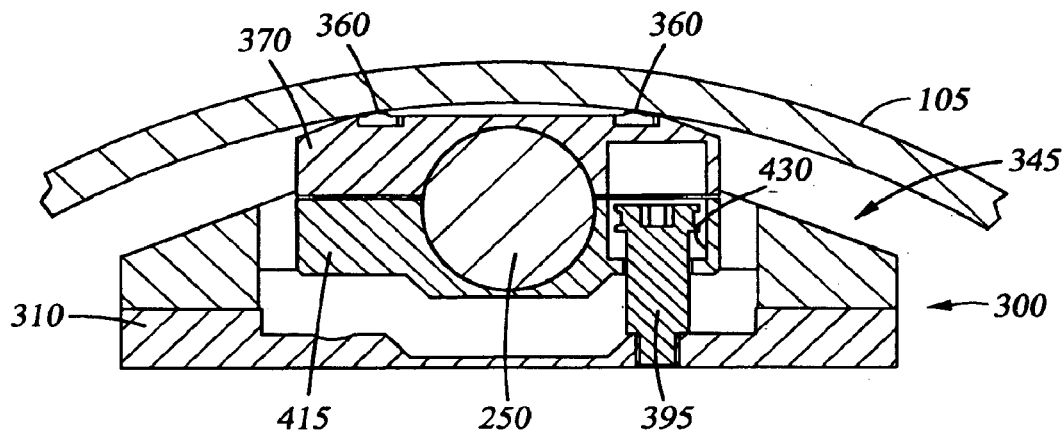
FIG. 13 is a cross-sectional view taken along line 13—13 in FIG. 11 to illustrate the guide mechanism after the activation of the deployment assembly.

FIG. 13 is a cross-sectional view taken along line 13—13 in FIG. 11 to illustrate the guide mechanism 395 after the activation of the deployment assembly 345. As shown, the guide mechanism 395 has remained stationary while the sensor component 250, bottom support 415, and the top support 370 have moved away from the seismic mandrel 310. In this manner the guide mechanism 395 has guided the sensor component radially outward toward the surrounding casing 105.

Figure 14:
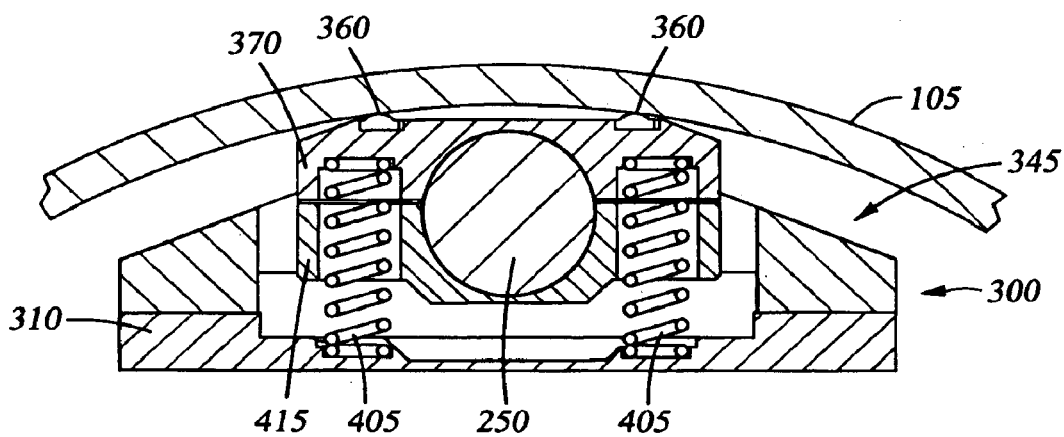
FIG. 14 is a cross-sectional view along line 14—14 in FIG. 11 illustrating a plurality biasing members after the activation of the deployment assembly.

FIG. 14 is a cross-sectional view along line 14—14 in FIG. 11 illustrating a plurality biasing members 405 after the activation of the deployment assembly 345. As shown, the plurality of biasing members 405 have pushed the sensor component 250 and the supports 415, 370 away from the seismic mandrel 310 and thereby allowing the contacts 360 to contact the surrounding casing 105.

Figure 15:
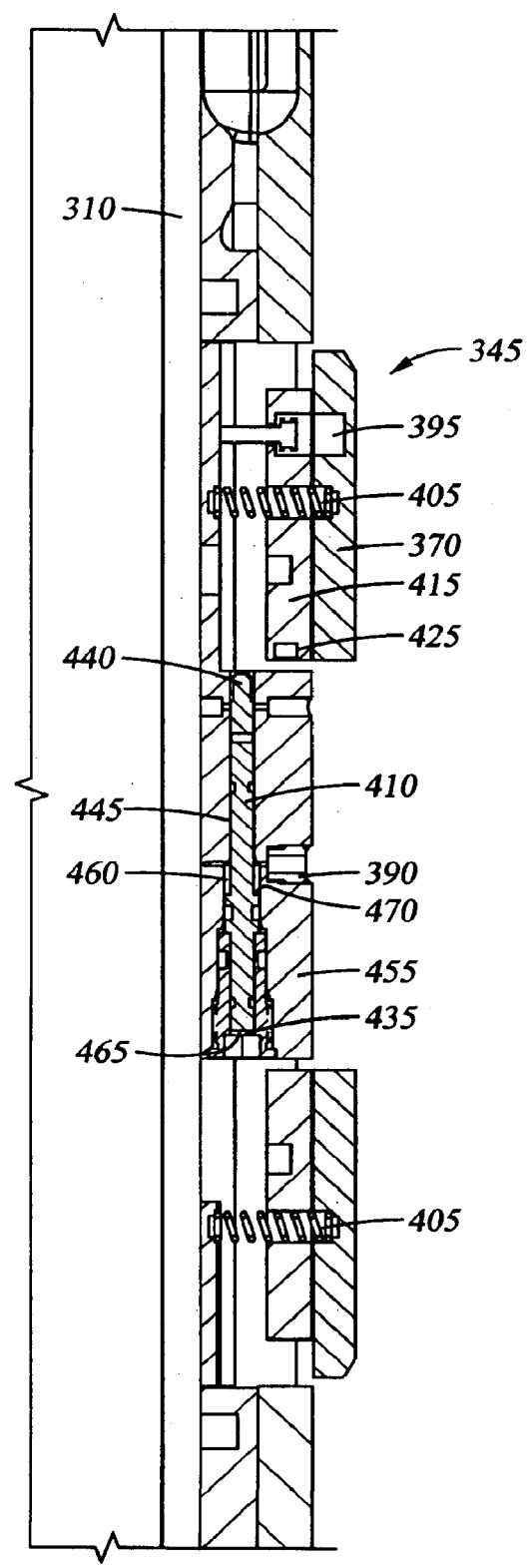
FIG. 15 is a cross-sectional view illustrating the location of a piston after activation of the deployment assembly.

FIG. 15 is a cross-sectional view illustrating the location of the piston 410 after activation of the deployment assembly 345. As stated in a previous paragraph, the rupture disc 390 has created a fluid passageway to the expandable chamber 460. As fluid fills the expandable chamber 460, a force is created on the piston shoulder 470. At a predetermined force, the force on the piston shoulder 470 becomes greater than the force on the piston end 465 created by the air in the chamber 435. At that point, the piston 410 moves in the bore 445 axially away from the profile 425 formed in the bottom support 415. It should be noted that the pressure differential is sufficient to move the piston 410 without the use of additional springs or mechanical mechanisms. As the piston head 440 moves out of the profile 425, the biasing members 405 urge the supports 415, 370 away from the seismic mandrel 310 as previously described. In this manner, the deployment assembly 345 uses well pressure to remotely release the sensor mechanism (not shown).

Figure 16:
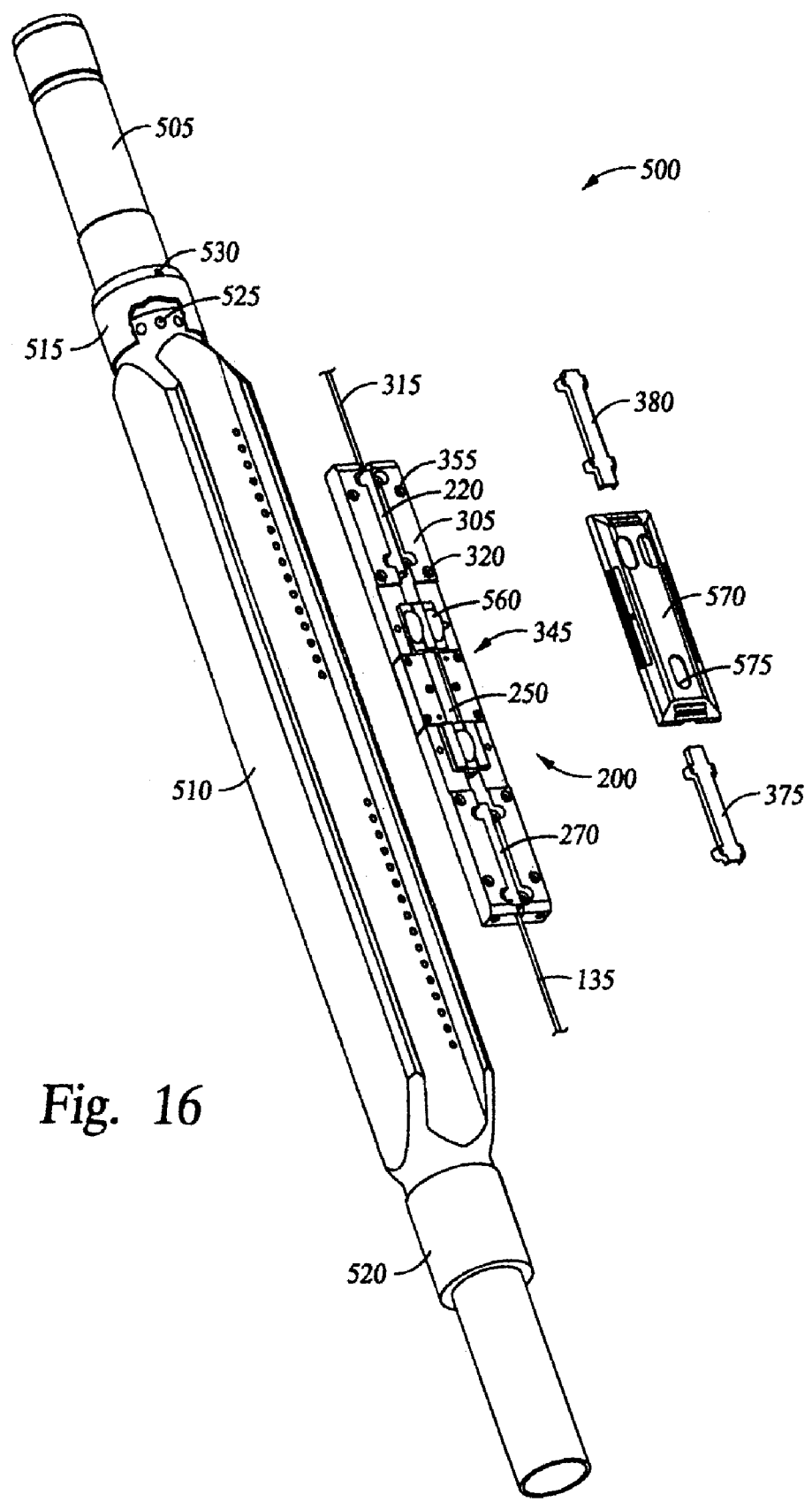
FIG. 16 is an isometric view illustrating an alternative embodiment of an adjustable deployment apparatus.

FIG. 16 is an isometric view illustrating an alternative embodiment of an adjustable deployment apparatus 500. In this embodiment, the seismic mechanism 200 may be adjusted both axially and rotationally to ensure proper placement. It is to be understood, however, that the arrangement of the apparatus 500 may be employed to permit only axial adjustment or rotational adjustment of the seismic mechanism 200. For convenience, components on the adjustable deployment apparatus 500 will be labeled with the same number as similar components on the adjustable deployment apparatus 300 as discussed in FIGS. 2 to 15.

The adjustable deployment apparatus 500 provides a means to rotationally adjust the sensor mechanism 200 to compensate for any rotational deviations in the production tubing (not shown), thereby ensuring the proper rotational alignment of the sensor mechanism 200 with other sensor mechanisms (not shown). The sensor mechanism 200 is rotationally adjusted during the assembly phase of the adjustable deployment apparatus 500. During assembly, the sensor mechanism 200 and sensor carrier 305 are secured to a seismic mandrel 510. Thereafter, the seismic mandrel 510 is disposed on a pup joint 505 until the lower end of the seismic mandrel 510 rests on a collar 520 at a lower end of the pup joint 505. Subsequently, the seismic mandrel 510 is rotated on the pup joint 505 to align the sensor mechanism 200 with other sensor mechanisms disposed thereabove or therebelow. After the seismic mandrel 505 is rotated to a desired location, the upper end of the seismic mandrel 505 is secured to the pup joint 505 by a plurality of set screws 525 and then a cover 515 is secured to the pup joint 505 by a set screw 530. In this manner, the adjustable deployment apparatus provides a means to adjust the rotational location of the sensor mechanism 200 to ensure proper rotational alignment with other sensor mechanisms.

The adjustable deployment apparatus 500 provides a means to adjust the axial location of the sensor mechanism 200 to compensate for any length deviations in the production tubing (not shown), thereby ensuring the proper spacing between the sensor mechanisms. The sensor mechanism 200 is adjusted in a similar manner as discussed in a previous paragraph. Therefore, the adjustment procedure will only be briefly discussed for this embodiment. Generally, the seismic mandrel 510 includes a plurality of adjustment holes 315 formed on an upper portion thereof. The plurality of holes 315 align with a plurality of mounting holes 320 for attaching the carrier 305 to the mandrel 510. The holes 315 are evenly spaced at along the upper portion of the mandrel 510 to define a predetermined length of axial movement for the carrier 305 and the sensor mechanism 200. After the seismic carrier 305 is moved to a desired position, a plurality of mechanical connectors 355, such as bolts, are used to secure the seismic carrier 305 to the seismic mandrel 510. In this manner, the sensor mechanism 200 is axially adjusted relative to other sensor mechanisms.

As clearly shown in FIG. 16, several covers have been removed to illustrate the location of the various components of the sensor mechanism 200 on the adjustable deployment apparatus 500. For instance, the upper splice tube cover 380 has been removed to illustrate the location of the first splice component 220 and the lower splice tube cover 375 has been removed to illustrate the location of the second splice component 270. Additionally, an accelerometer top support 570 is removed to indicate the location of the sensor component 250. The accelerometer top support 570 includes a plurality of holes 575 to allow a plurality of contact points 560 to protrude therethrough. The contact points 560 are positioned with a wide separation to achieve maximum stability when coupled to the surrounding casing (not shown). The contact points 560 are subject to wear as they contact the casing. Consequently, the contact points 560 are made of martenistic, precipitation hardened stainless steel UNS S17400 to reduce the wear during installation and operation.

Figure 17:
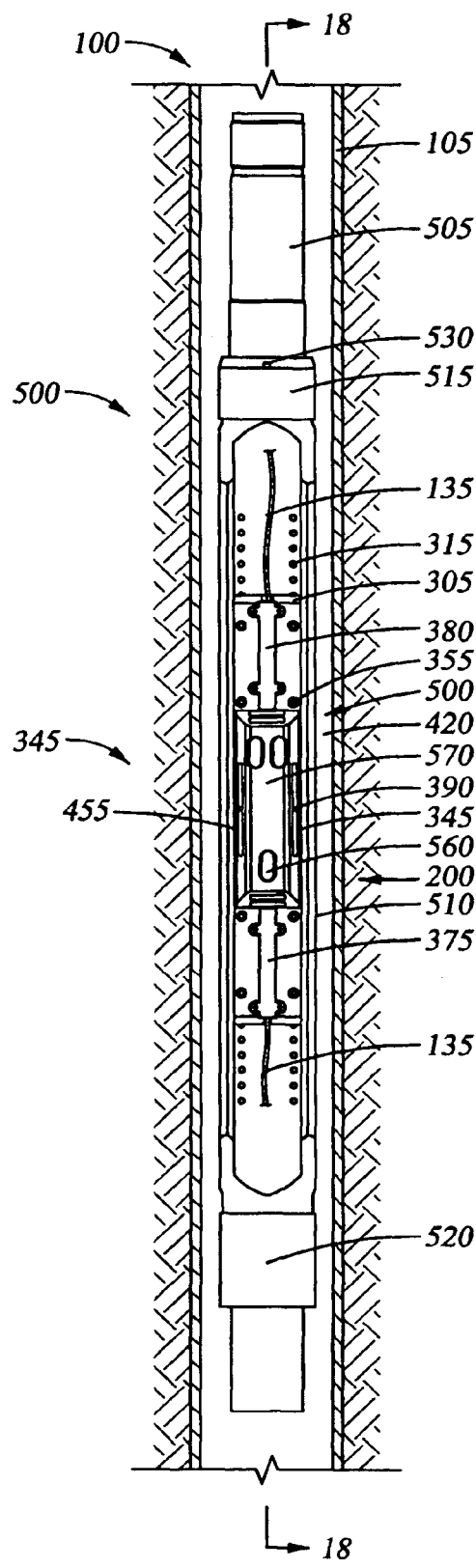
FIG. 17 is a view illustrating the adjustable deployment apparatus disposed in the wellbore.

FIG. 17 is a view illustrating the adjustable deployment apparatus 500 disposed in the wellbore. For clarity, the string of production tubing and other sensor mechanisms are not shown. As illustrated, the seismic carrier 305 is adjusted to a middle position on the seismic mandrel 510. In this position, the distance between the sensor mechanism 200 and other sensor mechanisms are substantially equal.

The adjustable deployment apparatus 500 includes the deployment assembly 345 with the piston release mechanism as previously described. For brevity, the deployment assembly 345 will be discussed in a general manner. The deployment assembly 345 includes the rupture disc 390 disposed in a bore formed in the side member 455. The bore is in fluid communication with the expandable chamber (not shown). To activate the deployment assembly 345, the annulus 420 is pressurized to create a pressure differential across the rupture disc 390. At a predetermined pressure, the disc 390 ruptures causing metal segments of the disc 390 to fold back to provide a path for fluid communication between the annulus 420 and the expandable chamber. As the expandable chamber (not shown) fills with fluid, the fluid becomes pressurized and moves the piston (not shown) to activate the deployment assembly 345. Thereafter, a plurality of biasing members (not shown) push the sensor component (not shown) and the plurality of contact points 560 toward the surrounding casing 105. In this manner, the adjustable deployment apparatus 500 provides a means to couple the sensor mechanism 200 to the surrounding casing 105.

Figure 18:
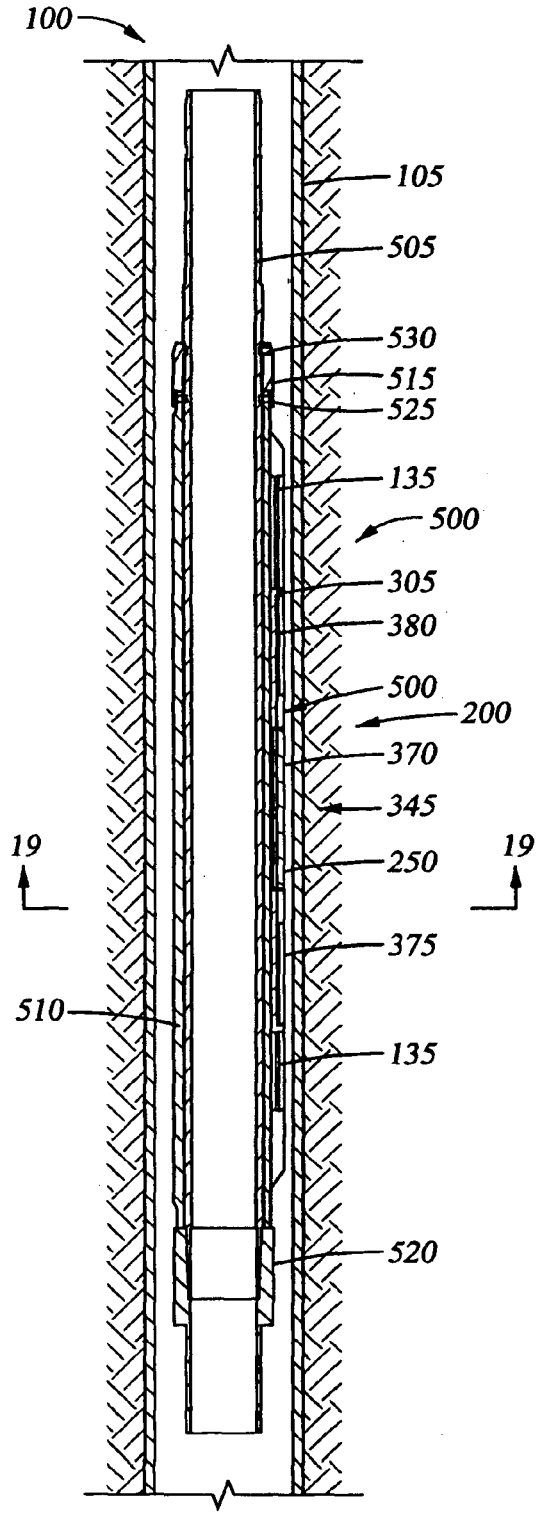
FIG. 18 is a cross-sectional view of the deployment apparatus disposed in the wellbore prior to coupling the sensor component to the surrounding casing.

FIG. 18 is a cross-sectional view of the deployment apparatus 500 disposed in the wellbore prior to attaching the sensor component 250 to the surrounding casing 105. As shown, the deployment assembly 345 is in an unreleased state holding the sensor component 250 and the plurality of contact points (not shown) adjacent the seismic mandrel 510. In the unreleased state, the apparatus 500 may be easily deployed and moved to a desired position within the well 100.

Figure 19:
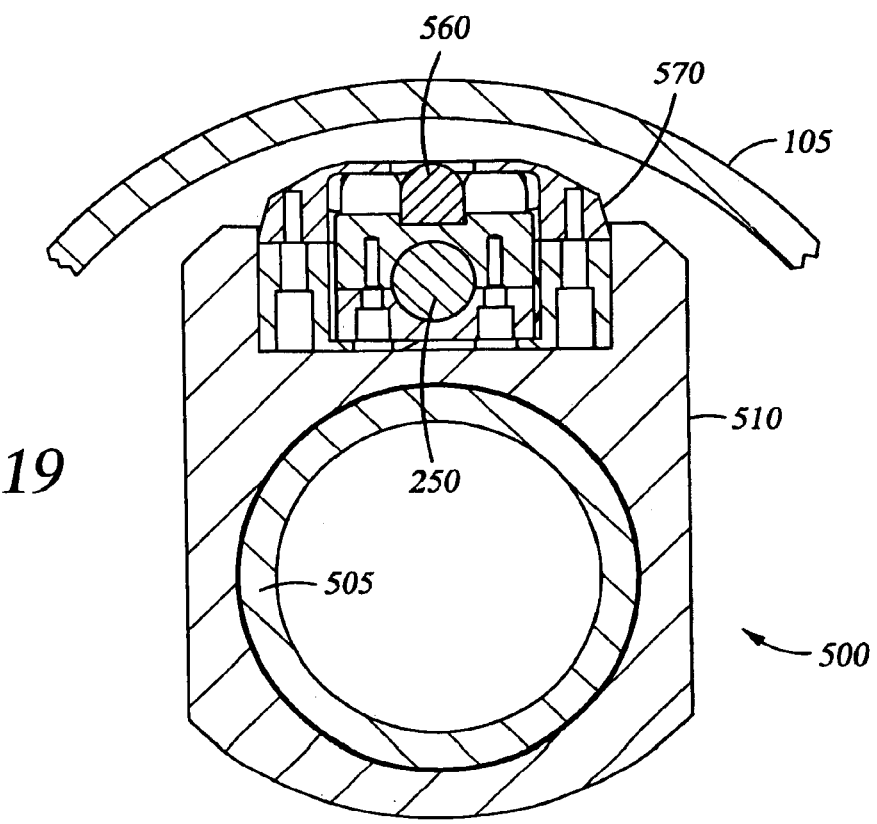
FIG. 19 is a cross-sectional view taken along line 19—19 in FIG. 18 to illustrate the location of the sensor component prior to activation of the deployment assembly.

FIG. 19 is a cross-sectional view taken along line 19—19 in FIG. 18 to illustrate the location of the sensor component 250 prior to activation of the deployment assembly (not shown). As shown, the sensor component 250 and the plurality of contact points 560 are located adjacent the seismic mandrel 510. As further shown, the contact points 560 are disposed substantially below the accelerometer top support 570, thereby minimizing the risk of wear and damage to the contact points 560 during deployment of the adjustable deployment apparatus 500.

Figure 20:
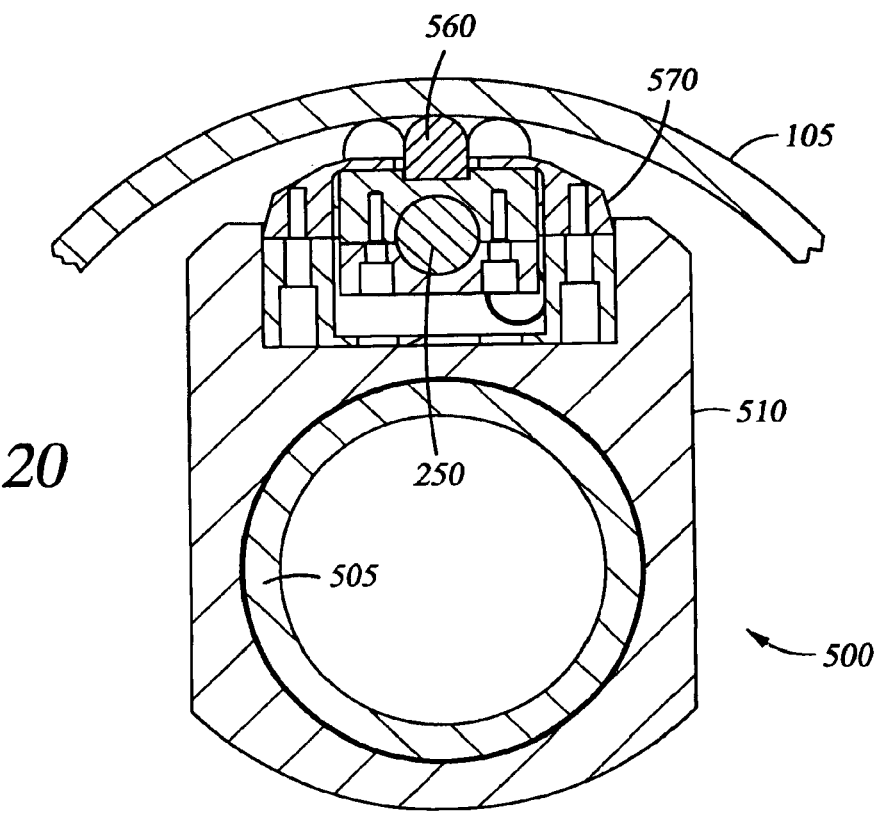
FIG. 20 is a cross-sectional view illustrating the location of the sensor component after the activation of the deployment assembly.

FIG. 20 is a cross-sectional view illustrating the location of the sensor component 250 after the activation of the deployment assembly (not shown). Generally, the plurality of biasing members (not shown) has pushed the sensor component 250 and the contact points 560 away from the seismic mandrel 510. In this position, the plurality of contact points 560 are in substantial contact with the surrounding casing 105, thereby allowing the sensor component to detect the motion from the surrounding earth layers as they react to the seismic waves.

In operation, a sensor mechanism is acoustically coupled to a surface of a wellbore by placing a deployment apparatus in a string of production tubing. The sensor mechanism is operatively attached to the adjustable deployment apparatus. Thereafter, the axial location of the sensor mechanism is adjusted on the deployment apparatus. Next, the rotational location of the sensor mechanism is adjusted on the deployment apparatus. Subsequently, the string of production tubing and the deployment apparatus is lowered to a predetermined location in the wellbore. Thereafter, the deployment apparatus is activated thereby urging the sensor mechanism radially outward and the sensor mechanism is acoustically coupled to the surface of the wellbore.

While the foregoing is directed to embodiments of the present invention, other and further embodiments of the invention may be devised without departing from the basic scope thereof, and the scope thereof is determined by the claims that follow.

What is claimed is:

1. An apparatus for acoustically coupling a sensor mechanism to a wall of a weilbore, comprising:
   a mandrel disposable In a tubing string;
   a carrier member disposed on the mandrel, the carrier member axially adjustable between at least two separate contact areas between the carrier and the mandrel;
   at least one sensor mounted on the carrIer member, the at least one sensor connected to a surface of the weilbore via a cable line; and
   a deployment assembly disposed on the carrier member for coupling the at least one sensor to the wall of the wellbore.

2. The apparatus of claim 1, wherein the cable line is an optical waveguide and the at least one sensor is an optical sensor.

3. The apparatus of claim 1, whereIn the at least one sensor is an optical seismic sensor.

4. The apparatus of claim 1, wherein the at least one sensor is a part of an arrangement of sensors for acquiring multi-component seismic data.

5. The apparatus of claim 1, wherein the deployment assembly includes at least one radially extendable member, operable with a release member.

6. The apparatus of claim 5, wherein the release mechanism includes a rupture disc and the extendable member is spring biased.

7. The apparatus of claim 5, wherein the rupture disc ruptures at a predetermined wellbore pressure.

8. The apparatus of claim 6, wherein the release mechanism further includes a movable piston.

9. The apparatus of claim 1, wherein the mandrel includes a plurality of adjustment holes for attaching the carrier member thereto.

10. The apparatus of claim 1, wherein the sensor mechanism includes at least one contact point for contacting the wall of the weilbore.

11. A method for acoustically coupling a sensor mechanism to a wall of a wellbore, comprising:
   placing a deployment apparatus in a string of production tubing, the deployment apparatus comprising:
   a mandrel;
   a carrier member disposed on the mandrel;
   at least one sensor mounted on the carrier member, the at least one sensor connected to a surface of the wellbore via an optical waveguide line; and
   a deployment assembly disposed on the carrier member for coupling the at least one sensor to the wall of the wellbore;
   axially adjusting the carrier member between at least two separate contact areas between the carrier and the mandrel and securing the carrier member to the mandrel;
   lowering the string of production tubing and the deployment apparatus into the wellbore;
   positioning the deployment apparatus at a predetermined location in the wellbore;
   activating the deployment assembly thereby urging the at least one sensor radially outward toward the wall of the wellbore; and
   coupling the at least one sensor to the wall of the wellbore.

12. The method of claim 11, wherein the deployment apparatus further comprises a body, whereby the mandrel is disposed on the body.

13. The method of claim 12, further including adjusting the mandrel to a desired rotational location relative to the body.

14. The method of claim 13, further including securing the mandrel to the desired rotational location by a plurality of set screws.

15. The method of claim 11, further including pressurizing an annulus formed between the deployment apparatus and the wall of the wellbore.

16. The method of claim 15, further including creating a pressure differential across a rupture disc disposed in the deployment assembly.

17. The method of claim 16, further including rupturing the rupture disc at a predetermined pressure thereby activating the deployment assembly.

18. The method of claim 11, further including guiding the sensor mechanism radially outward toward the wall of the wellbore by a guide mechanism in the deployment mechanism.

19. An apparatus for coupling a sensor mechanism to a wall of a wellbore, comprising:
   a body;
   a mandrel disposed on the body; and
   a carrier member disposed on the mandrel, the carrier member is axially movable between at least two separate contact areas between the carrier member and the mandrel and the carrier member having a deployment assembly capable of radially displacing the sensor mechanism toward the wall of the wellbore.

20. A method for acoustically coupling a sensor mechanism to a wall of a wellbore, comprising:
   placing a deployment apparatus in a string of production tubing, the sensor mechanism is operatively attached to the deployment apparatus;
   adjusting the axial location of the sensor mechanism relative to the deployment apparatus;
   adjusting the sensor mechanism to desired rotational location relative to the deployment apparatus;
   lowering the string of production tubing, the deployment apparatus and the sensor mechanism to a predetermined location in the wellbore:
   activating the deployment apparatus thereby urging the sensor mechanism radially outward toward the wall of the wellbore; and
   coupling the sensor mechanism to the wall of the weilbore.

21. An apparatus for acoustically coupling a sensor mechanism to a wall of a wellbore, comprising:
   a mandrel disposable in a tubing string, wherein the mandrel is disposable on a body and the mandrel is rotationally moveable relative to the body to a predetermined rotational position;

a carrier member disposed on the mandrel, the carrier member axially adjustable relative to the mandrel;

at least one sensor mounted on the carrier member, the at least one sensor connected to a surface of the wellbore via a cable line; and a deployment assembly disposed on the carrier member for coupling the at least one sensor to the wall of the wellbore.

22. The apparatus of claim 21, further including a plurality of set screws to secure the mandrel relative to the body at the predetermined rotational position.

* * * * *

UNITED STATES PATENT AND TRADEMARK OFFICE
CERTIFICATE OF CORRECTION

PATENT NO. : 6,986,389 B2  Page 1 of 1
APPLICATION NO. : 10/641402
DATED : January 17, 2006
INVENTOR(S) : Michael Foster et al.

It is certified that error appears in the above-identified patent and that said Letters Patent is hereby corrected as shown below:

In the claims section:

Column 13, Claim 1, line 20, please delete "welibore" and insert --wellbore--.

Column 13, Claim 1, line 21, please delete "In" and insert --in--.

Column 13, Claim 1, line 25, please delete "carrIer" and insert --carrier--.

Column 13, Claim 1, line 26, please delete "weilbore" and insert --wellbore--.

Column 13, Claim 10, line 55, please delete "weilbore" and insert --wellbore.--

Column 14, Claim 20, line 54, after "to" and before "desired", please insert --a--.

Column 14, Claim 20, lines 62 and 63, please delete "weilbore" and insert --wellbore--.

Signed and Sealed this

Twenty-eighth Day of November, 2006

JON W. DUDAS
*Director of the United States Patent and Trademark Office*